United States Patent
Park

(10) Patent No.: US 11,374,795 B2
(45) Date of Patent: Jun. 28, 2022

(54) GATEWAY APPARATUS AND METHOD FOR CONTROLLING THEREOF

(71) Applicants: Hyundai Motor Company, Seoul (KR); Kia Motors Corporation, Seoul (KR)

(72) Inventor: Pilyong Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 154 days.

(21) Appl. No.: 16/676,051

(22) Filed: Nov. 6, 2019

(65) Prior Publication Data

US 2020/0366529 A1 Nov. 19, 2020

(30) Foreign Application Priority Data

May 14, 2019 (KR) .................. 10-2019-0056486

(51) Int. Cl.
*H04L 12/66* (2006.01)
*H04L 69/22* (2022.01)
*B60R 16/023* (2006.01)
*H04L 69/08* (2022.01)

(52) U.S. Cl.
CPC .............. *H04L 12/66* (2013.01); *H04L 69/22* (2013.01); *B60R 16/023* (2013.01); *H04L 69/08* (2013.01)

(58) Field of Classification Search
CPC ......... H04L 12/40; H04L 12/66; H04L 67/12; H04L 69/08; H04L 69/22; H04L 2012/40215; H04L 2012/40273; H04L 12/40071; H04L 49/9084; H04W 4/40; B60R 16/023

See application file for complete search history.

(56) References Cited

U.S. PATENT DOCUMENTS

| | | | |
|---|---|---|---|
| 9,813,525 B2 * | 11/2017 | Kim ................... | H04L 12/4633 |
| 2014/0126584 A1 * | 5/2014 | Hwang ................ | H04L 12/413 |
| | | | 370/466 |
| 2014/0215491 A1 * | 7/2014 | Addepalli ............ | H04W 40/02 |
| | | | 719/313 |
| 2017/0109521 A1 * | 4/2017 | Ujiie .................... | G06F 21/44 |
| 2017/0331719 A1 * | 11/2017 | Park ..................... | H04L 45/00 |
| 2018/0076970 A1 * | 3/2018 | Han ..................... | H04L 12/46 |
| 2019/0132424 A1 * | 5/2019 | Jeong .................. | H04L 69/18 |
| 2019/0141133 A1 * | 5/2019 | Rajan ................... | G06F 13/387 |
| 2019/0296935 A1 * | 9/2019 | Hong ................... | H04L 12/40 |
| 2021/0014230 A1 * | 1/2021 | Kishikawa .......... | H04L 12/40104 |

FOREIGN PATENT DOCUMENTS

| | | | |
|---|---|---|---|
| CN | 104333517 A | * | 2/2015 |
| CN | 104503350 A | * | 4/2015 |
| EP | 3219553 A1 | * | 9/2017 ........... B60R 16/023 |

* cited by examiner

*Primary Examiner* — Khaled M Kassim
*Assistant Examiner* — Kai Chang
(74) *Attorney, Agent, or Firm* — Fox Rothschild LLP

(57) ABSTRACT

A gateway apparatus is provided and includes a communication unit that receives a message via a CAN communication network or an Ethernet communication network. A storage unit stores the received message and a controller converts a format of the received message in a format corresponding to a communication network of the target device based on a message characteristic including a format type of the received message and transmit the message of the converted format to the target device.

16 Claims, 3 Drawing Sheets

GATEWAY APPARATUS AND METHOD FOR CONTROLLING THEREOF

CROSS-REFERENCE TO RELATED APPLICATION(S)

This application claims priority to and the benefit of Korean Patent Application No. 10-2019-0056486, filed on May 14, 2019, the disclosure of which is incorporated by reference in its entirety.

BACKGROUND

1. Technical Field

The present disclosure relates to a gateway apparatus, and more particularly, to a gateway apparatus that transmits and receives messages through various communication networks and a method for controlling thereof.

2. Description of the Related Art

In-vehicle electronic devices transmit and receive data via a vehicle communication network. Recently, various options have been applied to vehicles, and therefore the complexity of electric parts and communication networks installed in the vehicles is increasing. As the complexity of such a communication network increases, a communication network for realizing a high bandwidth and a high communication speed may be considered, and an Ethernet communication network may be considered. An Ethernet-based network may support bidirectional communication through a pair of windings and may support transmission rates up to 10 Gbps.

SUMMARY

Therefore, the disclosure provides a gateway apparatus capable of transmitting and receiving messages via a communication network and a method for controlling thereof.

In accordance with an aspect of the disclosure, a gateway apparatus may include: a communication unit configured to receive a message via a Controller Area Network (CAN) communication network or an Ethernet communication network; a storage unit configured to store the received message; and a controller configured to convert a format of the received message in a format that corresponds to a communication network of the target device based on a message characteristic including a format type of the received message and transmit the message of the converted format to the target device.

When the received message is a CAN message, the controller may be configured to convert the format of the received message based on whether the frame structure of the CAN message is a single frame or a multi-frame. When the received message is an Ethernet message, the controller may be configured to convert the format of the received message based on the payload length of the Ethernet message. The controller may be configured to convert the CAN message into an Ethernet message when the frame structure of the CAN message is a single frame.

When the capacity of the received message is a predetermined maximum capacity when the frame structure of the CAN message is a multi-frame, the controller may be configured to convert the message stored in the storage unit into an Ethernet message and reset the storage unit after transmitting the converted Ethernet message to the target device. When the capacity of the received message is less than the predetermined maximum capacity when the frame structure of the CAN message is a multi-frame, the controller may be configured to convert the CAN message into an Ethernet message based on whether the entire the multi-frame are received.

The controller may be configured to convert the Ethernet message into a single frame CAN message when the payload length of the Ethernet message is less than a predetermined value. The controller may further be configured to configured to convert the Ethernet message into a multi-frame CAN message when the payload length of the Ethernet message exceeds a predetermined value. The controller may then be configured to configured to divide and transmit the converted multi-frame CAN message, and transmit the confirmation message through the path on which the message is received when all of the converted plural frames are transmitted. The controller may be configured to transmit the confirmation message via the Ethernet communication network.

In accordance with an aspect of the disclosure, a method for controlling a gateway apparatus may include: receiving a message via Controller Area Network (CAN) communication network or an Ethernet communication network; storing the received message; converting a format of the received message in a format that corresponds to a communication network of the target device based on a message characteristic including a format type of the received message; and transmitting the message of the converted format to the target device.

When the received message is a CAN message, the method may include converting the format of the received message based on whether the frame structure of the CAN message is a single frame or a multi-frame. When the received message is an Ethernet message, the method may include converting the format of the received message based on the payload length of the Ethernet message.

Additionally, the converting of a format of the received message may include: converting the CAN message into an Ethernet message when the frame structure of the CAN message is a single frame. When the capacity of the received message is a predetermined maximum capacity and the frame structure of the CAN message is a multi-frame, the message stored in the storage unit may be converted into an Ethernet message; and the storage unit may be reset after transmitting the converted Ethernet message to the target device.

When the capacity of the received message is less than the predetermined maximum capacity and the frame structure of the CAN message is a multi-frame, the CAN message may be converted into an Ethernet message based on whether all of the multi-frame are received. The Ethernet message may be converted into a single frame CAN message when the payload length of the Ethernet message is less than a predetermined value. Additionally, the Ethernet message may be converted into a multi-frame CAN message when the payload length of the Ethernet message exceeds a predetermined value.

The transmitting the message of the converted format to the target device may include: dividing and transmitting the converted multi-frame CAN message; and transmitting the confirmation message through the path on which the message is received when all of the converted plural frames are transmitted. The transmitting the confirmation message may further include: transmitting the confirmation message via the Ethernet communication network.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

Figure 1:
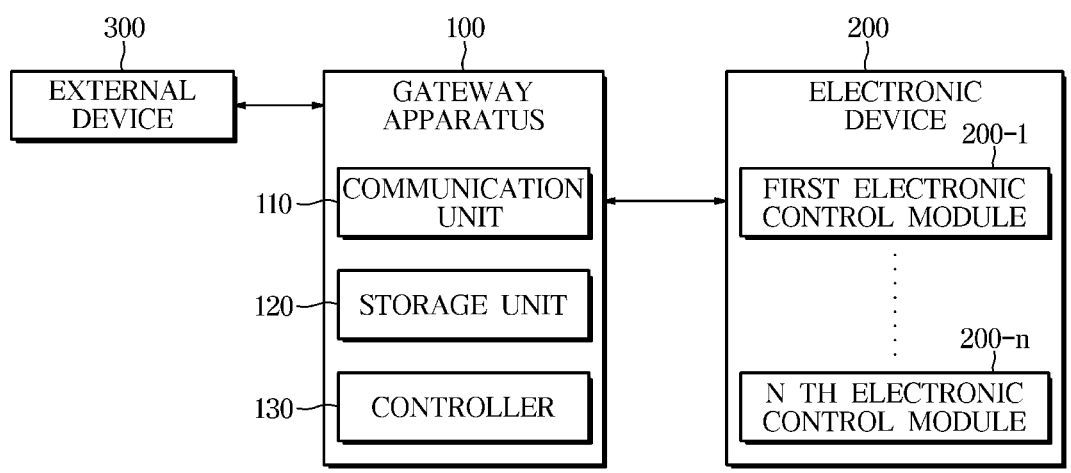
FIG. 1 is a control block diagram for a message routing system including a gateway apparatus according to one exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the working principle and exemplary embodiments of the present invention will be described with reference to the accompanying drawings.

FIG. 1 is a control block diagram for a message routing system including a gateway apparatus according to one exemplary embodiment. Referring to FIG. 1, a message routing system 1 according to an exemplary embodiment may include an electronic device 200 having a plurality of electronic control modules 200-1, . . . , 200-n, an external device 300 configured to diagnose whether the electronic device 200 is operating normally and a gateway apparatus 100 configured to transmit and receive data between the electronic device 200 and the external device 300.

The gateway apparatus 100 may include a communication unit 110, a storage unit 120, and a controller 130. The external device 300 may be configured to transmit a diagnostic signal to the electronic device 200 via the gateway apparatus 100 and the electronic device 200 may be configured to transmit a response signal that corresponds to the received signal to the external device 300 via the gateway apparatus 100. The external device 300 may be configured to diagnose whether the electronic device 200 is operating normally (e.g., without error, failure, malfunction, etc.) based on the received response signal.

The electronic device 200 may include a plurality of electronic control modules 200-1, . . . , 200-n, and may provide various functions. The electronic device 200 may be included in a vehicle (not shown), and each of the plurality of electronic control modules 200-1 to 200-n may provide various functions of a vehicle such as a navigation terminal, an engine and a brake system. The plurality of electronic control modules 200-1 to 200-n of the electronic device 200 may be connected to the gateway apparatus 100 via a wireless communication network or a wired communication network. Alternatively, the plurality of electronic control modules 200-1 to 200-n may be connected to each other via a wireless communication network or a wired communication network.

For example, the plurality of electronic control modules 200-1 to 200-n may use a wired communication network such as a Controller Area Network (CAN) communication network or a local area network (LAN). In addition, various wired communication networks such as a wide area network (WAN) network and various wireless communication networks may be used. Conventionally, many controllers included in a vehicle use CAN communication. However, in recent years, as vehicles provide more variety of functions, many controllers are using Ethernet communication to realize high bandwidth and high communication speed.

Accordingly, Diagnostic over Internet Protocol (DoIP) standard, which is an international standard based on Ethernet communication, has been developed in the field of diagnostic communication, but DoIP is used for specifications considering only environment based on Ethernet communication network. Accordingly, compatibility problems with existing CAN communication may occur, and since the external device 300 must be implemented as a separate Ethernet communication-based device to diagnose the operation of the electronic device 200, a device using a conventional CAN communication base may not be utilized. Therefore, a gateway apparatus capable of ensuring compatibility with CAN communication as well as conforming to the DoIP standard is required.

Moreover, the gateway apparatus 100 may be configured to perform routing for exchanging messages between the electronic device 200 and the external device 300. The gateway apparatus 100 may include a communication unit 110 configured to receive a message from the electronic device 200 or the external device 300, a storage unit 120, and a controller 130 configured to execute the overall operation of the gateway apparatus 100. The communication unit 110 may include one or more components that enable communication with a plurality of electronic control modules 200-1 to 200-n of the electronic device 200 or an external device 300, for example, at least one of a short range communication module, a wired communication module, and a wireless communication module.

The short-range communication module may include various short-range communication modules configured to transmit and receive signals using a wireless communication network in a short distanceuses, such as a Bluetooth module, an infrared communication module, an RFID (Radio Frequency Identification) communication module, a WLAN (Wireless Local Access Network) communication module, an NFC communication module, and a Zigbee communication module.

The wired communication module may include a wired communication module such as a CAN (Controller Area Network) communication module, a local area network (LAN) module, a wide area network (WAN) module, or a value added network Communication module and various cable communication such as USB (Universal Serial Bus), HDMI (High Definition Multimedia Interface), DVI (Digital Visual Interface), RS-232 (recommended standard 232), power line communication or POTS (plain old telephone service) Modules.

In addition to the Wifi module and the wireless broadband module, the wireless communication module may include a GSM (Global System for Mobile Communication), a CDMA (Code Division Multiple Access), a WCDMA (Wideband Code Division Multiple Access), UMTS (universal mobile telecommunications system), TDMA (Time Division Multiple Access), LTE (Long Term Evolution) and the like.

The wireless communication module may include a wireless communication interface including an antenna and a transmitter for transmitting a message signal. The wireless communication module may further include a message signal conversion module for modulating the digital control signal output from the controller 130 through the wireless communication interface into an analog type wireless signal under the operation of the controller. The wireless communication module may include a wireless communication interface including an antenna and a receiver for receiving a message signal. The wireless communication module may further include a message signal conversion module for demodulating the analog type wireless signal received through the wireless communication interface into a digital control signal.

Furthermore, the storage unit 120 may be configured to store various information related to the received message. The storage unit 120 may be configured to store the received message in the format of the received message, store the format-converted message, and store the message divided in various forms. In addition, the storage unit 120 may be configured to store data necessary for processing various protocols. For example, data for processing an ISO-TP may be stored in the storage unit 120, and routing table including a data such as a TA (target address) IP and a TA-CAN ID necessary for the routing operation of the gateway apparatus 100 may be stored in the storage unit 120.

The storage unit 120 may be implemented as a buffer. In particular, a message may be stored up to a predetermined storage capacity to prevent a message from being missed. The storage unit 120 may include a nonvolatile memory such as a cache, a read only memory (ROM), a programmable ROM (PROM), an erasable programmable ROM (EPROM), an electrically erasable programmable ROM (EEPROM) and Flash memory or a volatile memory such as a RAM (Random Access Memory) or a storage medium such as a hard disk drive (HDD), a CD-ROM, or the like, but is not limited thereto. The storage unit may be a memory implemented as a chip separate from the processor described above with respect to the controller 130, which will be described later, and may be implemented as a single chip with the processor.

The controller 130 may be configured to perform routing for messages received from the external device 300 or the electronic device 200. The controller 130 may be configured to confirm the received message format and operate the communication unit 110 and the storage unit 120 to perform the routing operation differently based on the received message format. Additionally, the controller 130 may be configured to change the format of the message so that the received message format corresponds to the communication network used by the device to which the corresponding message is to be transmitted and may be configured to transmit the changed formatted message to the external device 300 or the electronic device 200.

Particularly, the controller 130 may be configured to convert the received first network message into a second network message to be transmitted. Each of the first network and the second network may utilize the wired communication network or wireless communication network described above. For example, when at least one of the plurality of electronic control modules 200-1 to 200-n of the electronic device 200 uses the Ethernet network, and the external device 300 uses the CAN network, the gateway apparatus 100 may be configured to perform routing for message exchange between the Ethernet network and the CAN network. Hereinafter, the first network will be described as a CAN network and the second network will be described as an Ethernet network. However, the present invention is not limited to this, and the operation of the controller 130, which will be described later, may be applied to a message routing operation between different networks.

The controller 130 may be configured to convert a CAN network message (hereinafter, referred to as a CAN message) into an Ethernet network message (hereinafter referred to as an Ethernet message) or an Ethernet network message into a CAN network message. The controller 130 may be configured to operate the communication unit 110 and the storage unit 120 to perform routing operations differently based on the characteristics of the received message. In particular, the characteristics of the received message may include information regarding the size of the message as well as the format type of the message, and the controller 130 may be configured to operate the communication unit 110 and the storage unit 120 differently based on the comparison result of the size of the received message and the predetermined size.

When the Ethernet message is received, the size of the message may be determined by the length of the payload of the Ethernet message, and the controller 130 may be configured to perform routing based on the comparison result between the payload length of the Ethernet message and a predetermined reference value.

Hereinafter, the routing operation of the controller 130 will be described in detail by dividing the reception of the CAN message and the reception of the Ethernet message. When a CAN message is received, the size of the message may be determined by the frame structure of the CAN message, and the controller 130 may be configured to perform routing based on whether the frame structure of the CAN message is a single frame or a multi-frame.

Specifically, when the received CAN message is a single frame structure, the controller 130 may be configured to convert the received single frame CAN message into an Ethernet message. At this time, the controller 130 may be configured to convert the received single frame CAN message into a message according to the DoIP format. The controller 130 may be configured to complete the message routing by transmitting the format-converted Ethernet message to the node to be transmitted. Alternatively, when the received CAN message has a multi-frame structure, the controller 130 may be configured to receive the divided CAN message including the FF (first frame) and CF (consecutive frame) and store the divided multi-frame CAN message in the storage unit 120.

The controller 130 may be configured to convert the stored CAN messages of the multi-frame into Ethernet messages, and more specifically, convert the stored CAN messages into messages according to the DoIP format. In particular, the controller 130 may be configured to detect whether the divided multi-frame CAN message is received by a predetermined size. The predetermined size may be the storage capacity of the storage unit 120. When the divided multi-frame CAN message is received by a predetermined size, the controller 130 may be configured to transmit the converted Ethernet message to a target device and delete the divided multi-frame CAN message stored in the storage unit 120. At this time, the controller 130 may be configured to reset or update the storage unit 120 in a state before the message is received by deleting the stored divided multi-frame CAN message.

In this case, the target device is a device capable of receiving a message from the gateway apparatus 100 through a wired communication network or a wireless communication network. For example, the target device may be the electronic device 200 or the external device 300 constituting the message routing system 1.

Alternatively, the controller 130 may be configured to convert the received CAN message into an Ethernet message format each time each frame of the divided CAN message is received, and store the format-converted message in the storage unit 120. When the size of the converted message is a predetermined size, the controller 130 may be configured to transmit the format-converted message stored in the storage unit 120 to the target device and delete the format-converted message stored in the storage unit 120.

At this time, the controller 130 may be configured to reset or update the storage unit 120 in a state before the message is received, that is, in a state of designing, by deleting the stored format-converted message. Accordingly, the controller 130 may be configured to prevent an overflow according to the limited storage capacity of the storage unit 120 and prevent data loss. On the other hand, when receiving the multi-frame CAN message, the controller 130 may be configured to perform flow control.

Further, when an Ethernet message is received, the size of the message may be determined by the payload length of the Ethernet message, and the controller 130 may be configured to perform routing based on whether the payload length of the Ethernet message is less than or equal to a predetermined reference value. The predetermined reference value may be about 8 bytes, but it is not limited to this, and may be set to various values according to the design.

Specifically, when the payload length of the received Ethernet message is less than or equal to a predetermined reference value, the controller 130 may be configured to convert the received Ethernet message into a CAN message. The received Ethernet message may be a DoIP format message, and the controller 130 may be configured to complete the message routing by converting the message of the DoIP format into the CAN format and transmitting the format-converted CAN message to the node to be transmitted.

Alternatively, when the payload length of the received Ethernet message exceeds a predetermined reference value, the controller 130 may be configured to store the received Ethernet message in the storage unit 120. The controller 130 may be configured to convert the Ethernet message stored in the storage unit 120 into a CAN message. At this time, the controller 130 may be configured to complete the message transmission by dividing the converted CAN message into a multi-frame and transmitting the divided CAN message to the node to be transmitted.

When the format conversion of one Ethernet message is completed, that is, when one Ethernet message is divided into CAN messages, the controller may be configured to transmit a confirmation message through the path on which the message is received. The controller 130 may then be configured to transmit the confirmation message to a path of receiving the message or a device that has transmitted the Ethernet message (hereinafter referred to as an Ethernet controller), and the confirmation message may be an acknowledgment (ACK) message.

Moreover, the Ethernet controller may be at least one electronic control module of the electronic device 200 in this exemplary embodiment, but is not limited thereto. In addition, the confirmation message transmitted to the Ethernet controller may have an Ethernet communication network format, and may be a DoIP message. The Ethernet controller may be configured to transmit the next Ethernet message to the gateway apparatus 100 when the confirmation message is received. Accordingly, overflow of the storage unit 120 due to subsequent message transmission may be prevented, and data loss may be prevented.

Meanwhile, in the process of converting into the Ethernet message, the controller 130 may be configured to stack data in units of data of the CAN message in the User Data field of the Ethernet message. In addition, the controller 130 may be configured to convert the Ethernet message to include the N-PCI (Peripheral Component Interconnect) information of the received CAN message to minimize the computation amount and minimize the network delay.

The controller 130 may be implemented as a memory (not shown) for storing an algorithm for executing the operation of the components in the gateway apparatus 100 or a data for a program reproducing the algorithm and a processor that performs the above-described operations using data stored in the memory. The memory and the processor may be implemented as separate chips. Alternatively, the memory and the processor may be implemented on a single chip. On the other hand, when the electronic device 200 is included in a vehicle (not shown), the gateway apparatus 100 may also be included in a vehicle (not shown).

At least one component may be added or deleted corresponding to the performance of the components of the gateway apparatus 100 shown in FIG. 1. It will be readily understood by those skilled in the art that the mutual position of the components may be changed corresponding to the performance or structure of the system. In the meantime, each of the components shown in FIG. 1 denotes a software and/or a hardware component such as a Field Programmable Gate Array (FPGA) and an Application Specific Integrated Circuit (ASIC).

Figure 2:
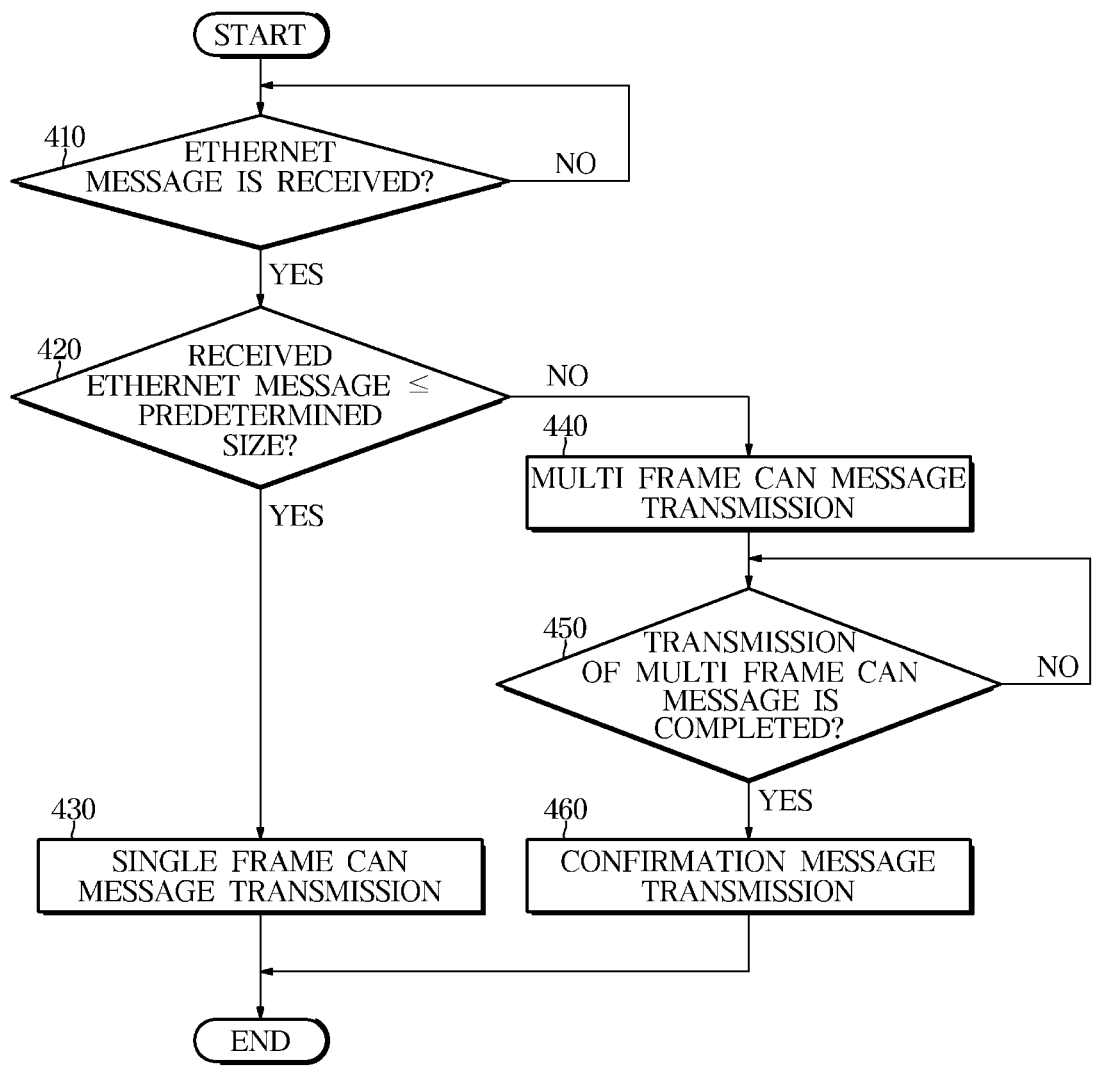
FIG. 2 is a flowchart of a message routing method of a gateway apparatus according to an exemplary embodiment.

FIG. 2 is a flowchart of a message routing method of a gateway apparatus according to an embodiment. Referring to FIG. 2, the gateway apparatus 100 according to an exemplary embodiment may be configured to determine whether an Ethernet message is received (410). The Ethernet message may be a DoIP message.

When an Ethernet message is received, the gateway apparatus 100 may be configured to determine whether the size of the received Ethernet message is less than or equal to a predetermined size (420). Specifically, the gateway apparatus 100 may be configured to determine whether the payload length of the Ethernet message is equal to or less than a predetermined reference value as a message size. The predetermined reference value may be about 8 bytes and is not limited to this, and may be set to various values according to the design.

When the payload length of the Ethernet message is less than or equal to a predetermined reference value, the gateway apparatus 100 may be configured to convert the received Ethernet message into a single frame CAN message and transmit the converted single frame CAN message to the node to be transmitted (430). As another example, when the payload length of the Ethernet message exceeds a predetermined reference value, the gateway apparatus 100 may be configured to store the received Ethernet message, convert the stored Ethernet message into a CAN message, and transmit the multi-frame CAN message (440).

Additionally, the gateway apparatus 100 may be configured to detect whether the transmission of the multi-frame CAN message for one Ethernet message is completed 450. When the transmission of the multi-frame CAN message to one Ethernet message is completed, the gateway apparatus 100 may be configured to transmit a confirmation message through the Ethernet communication network (460). In particular, the confirmation message (ACK message) may have an Ethernet communication network format and may be a DoIP message. Accordingly, overflow of the storage unit 120 due to subsequent message transmission may be prevented, and data loss may be prevented.

Figure 3:
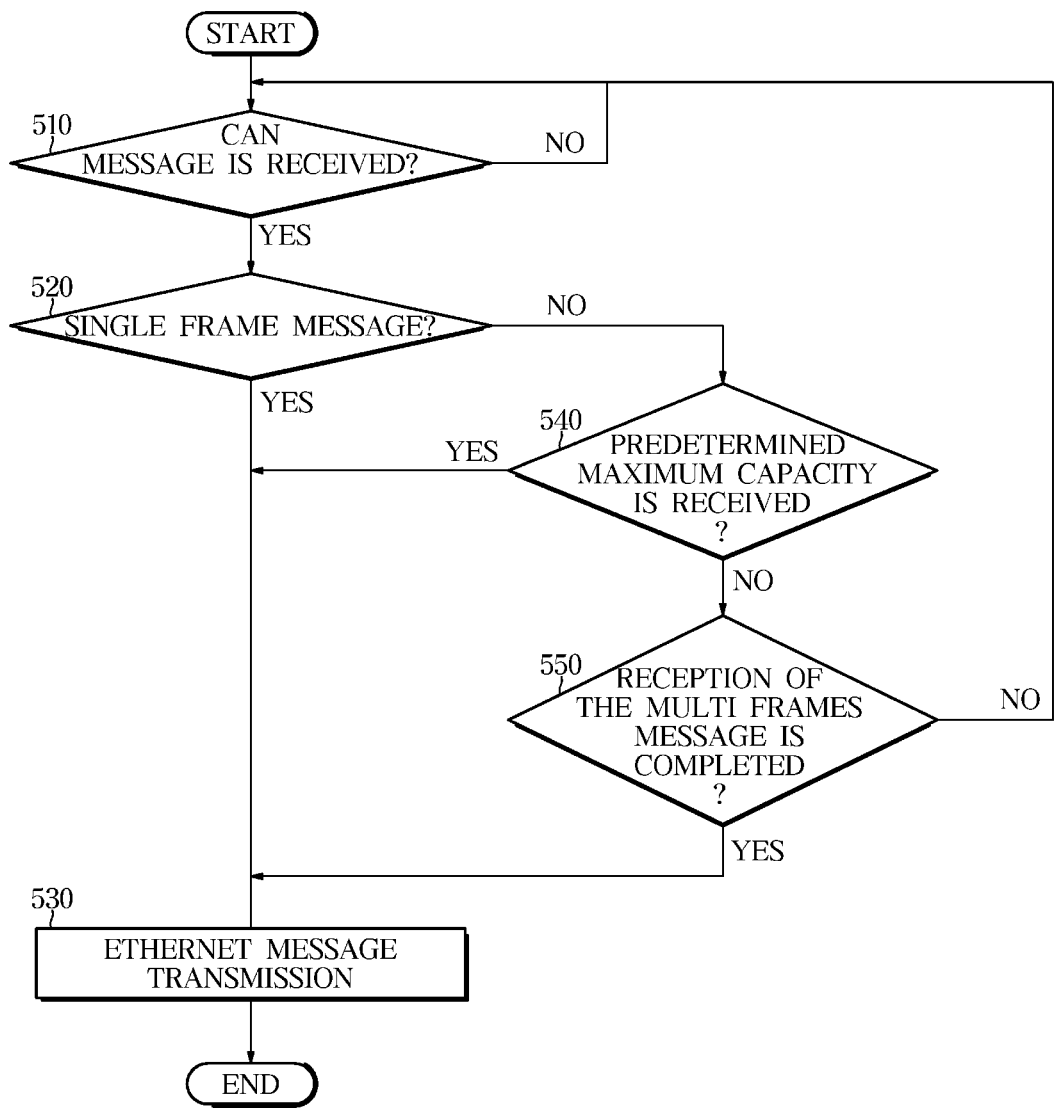
FIG. 3 is a flowchart of a message routing method of a gateway apparatus according to an exemplary embodiment.

FIG. 3 is a flowchart of a message routing method of a gateway apparatus according to an exemplary embodiment. The method described herein below may be executed by a controller. Referring to FIG. 3, the gateway apparatus 100 according to an exemplary embodiment may be configured to detect whether a CAN message is received 510, and when a CAN message is received, detect whether the message is a single frame message (520).

When the received CAN message is a single frame structure, the gateway apparatus 100 may be configured to convert the received single frame CAN message to an Ethernet message and transmit the converted Ethernet message (530). The Ethernet message may be a DoIP message. As another example, when the received CAN message is not a single frame structure but a multi-frame structure, the gateway apparatus 100 may be configured to detect whether the capacity of the received CAN message is a predetermined maximum capacity (540). At this time, the predetermined maximum capacity may be the storage capacity of the storage unit 120.

When the capacity of the received multi-frame CAN message is less than the predetermined maximum capacity, the gateway apparatus 100 may be configured to detect whether the reception of the multi-frame CAN message is completed (550). When all the data of all the frames included in the CAN message are received, the gateway apparatus 100 may be configured to determine that the reception of the CAN message is completed.

When the reception of the CAN message is completed, the gateway apparatus 100 may be configured to convert the received CAN message into an Ethernet message and transmit the converted Ethernet message (560). On the other hand, when the reception of the multi-frame CAN message is not completed, that is, when not all the data of all the frames included in the CAN message are received, the gateway apparatus 100 may continue to determine whether the CAN message is received (510). In other words, it may be possible to wait for receiving the CAN message. The subsequent operation is the same as described above.

When the capacity of the received multi-frame CAN message is a predetermined maximum capacity, that is, when the predetermined maximum capacity is received, the gateway apparatus 100 may be configured to convert the received CAN message into an Ethernet message and transmit the converted Ethernet message (560). After transmitting the converted Ethernet message, the gateway apparatus 100 may be configured to delete the divided multi-frame CAN messages stored in the storage unit 120. Accordingly, the gateway apparatus 100 may be configured to prevent overflow due to the limited storage capacity of the storage unit 120 and prevent data loss.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all types of recording media storing commands that can be interpreted by a computer. For example, the computer-readable recording medium may be ROM, RAM, a magnetic tape, a magnetic disc, flash memory, an optical data storage device, etc. According to one aspect of the gateway apparatus and the method for controlling thereof, it may be possible to maintain compatibility between different communication networks and to prevent data loss due to overflow of the buffer.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A gateway apparatus, comprising:
   a communication unit configured to receive a message via a controller area network (CAN) or an Ethernet communication network;

a storage unit configured to store the received message; and a controller configured to convert a format of the received message into a format that corresponds to a communication network of a target device based on a message characteristic including a format type of the received message and transmit the message of the converted format to the target device, wherein, when the received message is a CAN message, the controller is configured to convert the CAN message into an Ethernet message based on whether a frame structure of the CAN message is a single frame structure or a multi-frame structure, and when the received message is an Ethernet message, the controller is configured to convert the Ethernet message into a CAN message based on size of the received message, wherein, when the frame structure of the received CAN message is the multi-frame structure, the controller is configured to:
store a divided multi-frame CAN message in the storage unit,
convert the divided multi-frame CAN message stored in the storage unit to the Ethernet message based on the divided multi-frame CAN message is stored in the storage unit by a predetermined storage capacity of the storage unit,
transmit the converted Ethernet message to the target device, and
delete the divided multi-frame CAN message stored in the storage unit.

2. The gateway apparatus according to claim 1, wherein the controller is configured to convert the Ethernet message into the CAN message based on a payload length of the Ethernet message.

3. The gateway apparatus according to claim 1, wherein the controller is configured to convert the CAN message into the Ethernet message when the frame structure of the CAN message is the single frame structure.

4. The gateway apparatus according to claim 1, when the size of the stored divided multi-frame CAN message is less than the predetermined storage capacity of the storage unit, the controller is configured to convert the divided multi-frame CAN message into the Ethernet message based on whether entire multi-frames are received.

5. The gateway apparatus according to claim 2, wherein the controller is configured to convert the Ethernet message into a single frame CAN message when the payload length of the Ethernet message is less than a predetermined value.

6. The gateway apparatus according to claim 2, wherein the controller is configured to convert the Ethernet message into a multi-frame CAN message when the payload length of the Ethernet message exceeds a predetermined value.

7. The gateway apparatus according to claim 6, wherein the controller is configured to divide and transmit the converted multi-frame CAN message, and transmit a confirmation message through a path on which the message is received when all of the converted plural frames are transmitted.

8. The gateway apparatus according to claim 7, wherein the controller is configured to transmit the confirmation message via the Ethernet communication network.

9. A method for controlling a gateway apparatus, comprising:
receiving, by a controller, a message via a controller area network (CAN) or an Ethernet communication network;
storing, by the controller, the received message in a storage unit;
converting, by the controller, a format of the received message in a format corresponding to a communication network of a target device based on a message characteristic including a format type of the received message; and
transmitting, by the controller, the message of the converted format to the target device,
wherein the converting of the format of the received message includes:
when the received message is a CAN message, converting the CAN message into an Ethernet message based on whether a frame structure of the CAN message is a single frame structure or a multi-frame structure; and
when the received message is an Ethernet message, converting the Ethernet message into a CAN message based on size of the received message,
wherein the converting of the CAN message into the Ethernet message includes:
when the frame structure of the CAN message is the multi-frame structure, storing a divided multi-frame CAN message in the storage unit;
converting the divided multi-frame CAN message stored in the storage unit to the Ethernet message based on the divided multi-frame CAN message is stored in the storage unit by predetermined storage capacity of the storage unit;
transmitting the converted Ethernet message to the target device; and
deleting the divided multi-frame CAN message stored in the storage unit.

10. The method according to claim 9, wherein the converting of the format of the received message includes:
converting, by the controller, the Ethernet message into the CAN message based on a payload length of the Ethernet message.

11. The method according to claim 9, wherein the converting of the format of the received message includes:
converting, by the controller, the CAN message into the Ethernet message when the frame structure of the CAN message is the single frame structure.

12. The method according to claim 9, wherein the converting of the CAN message into the Ethernet message includes:
when the size of the stored divided multi-frame CAN message is less than the predetermined storage capacity of the storage unit, converting, by the controller, the CAN message into the Ethernet message based on whether entire multi-frames are received.

13. The method according to claim 10, wherein the converting of the format of the received message includes:
converting, by the controller, the Ethernet message into a single frame CAN message when the payload length of the Ethernet message is less than a predetermined value.

14. The method according to claim 10, wherein the converting of the format of the received message includes:
converting, by the controller, the Ethernet message into a multi-frame CAN message when the payload length of the Ethernet message exceeds a predetermined value.

15. The method according to claim 14, wherein the transmitting of the message of the converted format to the target device includes:
dividing and transmitting, by the controller, the converted multi-frame CAN message; and transmitting, by the controller, the confirmation message through a path on which the message is received when all of the converted plural frames are transmitted.

16. The method according to claim 15, wherein the transmitting of the confirmation message includes:
transmitting, by the controller, the confirmation message through the Ethernet communication network.

* * * * *